United States Patent

[11] 3,587,470

| [72] | Inventor | Paul R. Wilson<br>Los Angeles County, Calif. (17830 Bahama St., Northridge, Calif. 91324) |
|---|---|---|
| [21] | Appl. No. | 714,664 |
| [22] | Filed | Mar. 20, 1968 |
| [45] | Patented | June 28, 1971 |

[54] VEHICULAR TRANSPORTATION SYSTEM AND APPARATUS
12 Claims, 14 Drawing Figs.

[52] U.S. Cl. .................................................. 104/149, 104/88
[51] Int. Cl. ..................................................... B61b 5/02, B611 7/06
[50] Field of Search .......................................... 104/18, 20, 148, 149, 152; 104/88, 138, 172 (C); 105/61; 191/48 (C)

[56] References Cited
UNITED STATES PATENTS

| 3,037,462 | 6/1962 | Barry | 104/18 |
| 3,254,608 | 6/1966 | Alden | 104/149 |
| 3,368,496 | 2/1968 | Falk | 104/148 |
| 3,403,634 | 10/1968 | Crowder | 104/88 |
| 891,416 | 6/1908 | Fenyo | 104/138 |
| 2,685,003 | 7/1954 | Barnes | 191/48 |
| 3,118,392 | 1/1964 | Zimmerman | 104/88 |
| 3,263,625 | 8/1966 | Midis | 104/88 |
| 3,357,367 | 12/1967 | Etheridge | 104/172 |

OTHER REFERENCES

Marchand, TRANSPORTATION SYSTEM FOR PEOPLE OR FREIGHT SYNCHRONIZING MOVEMENT OF INDIVIDUAL VEHICLES [A public communication to the United States Department of Commerce, Office of High Speed Ground Transportation]. June 24, 1966.

Primary Examiner—Arthur L. La Point
Assistant Examiner—D. W. Keen
Attorney—Roger A. Marrs ABSTRACT: The vehicular transportation system and apparatus disclosed herein includes a main traffic conduit or course extending between population communities for automatically processing self-propelled passenger vehicles therealong and which is adapted to permit individual vehicles in controlled groups of the self-propelled passenger vehicles to selectively enter and exit the course by interchange means provided at predetermined locations along the length of the course. A pacer vehicle is employed to control the spacing intervals between groups of vehicles travelling on the course and a common power source is provided to supply motive power for the passenger and pacer vehicles.

PATENTED JUN28 1971
3,587,470
SHEET 1 OF 3
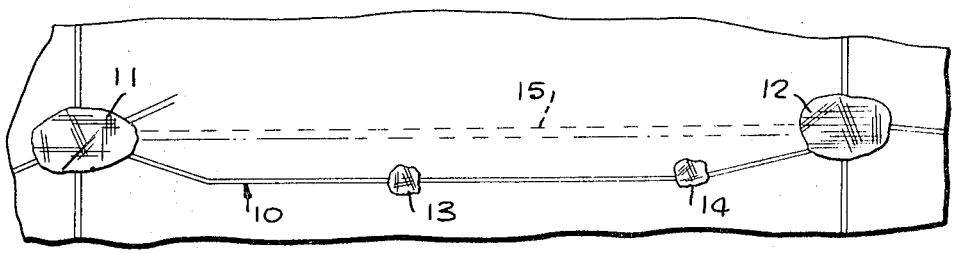
Fig. 1
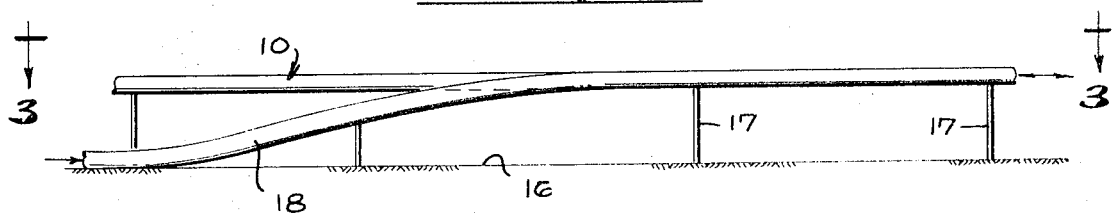
Fig. 2
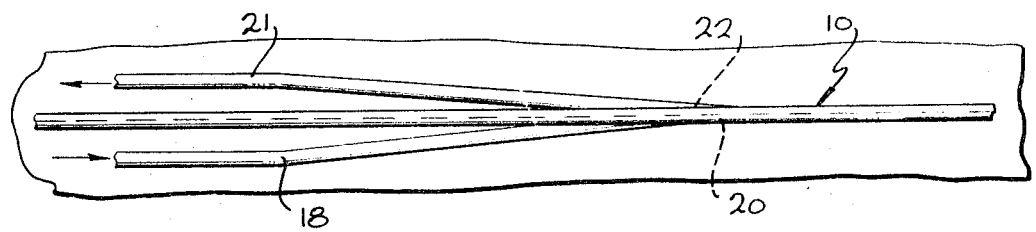
Fig. 3
Fig. 12
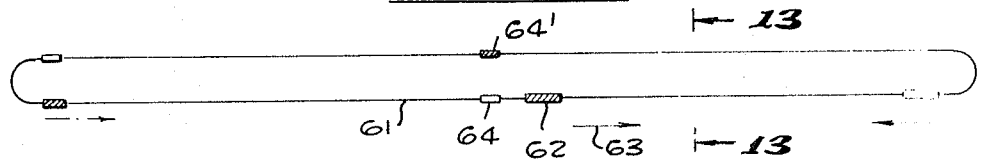
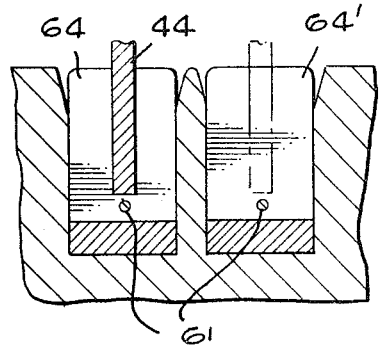
Fig. 13
INVENTOR.
PAUL R. WILSON
BY
Roger G. Marrs

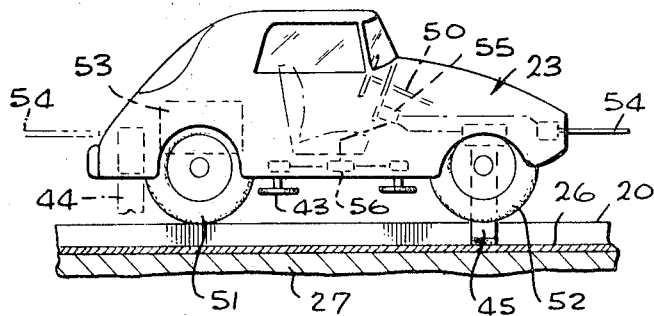
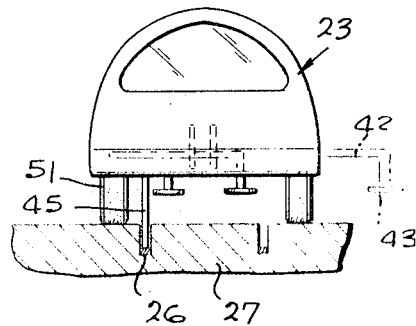
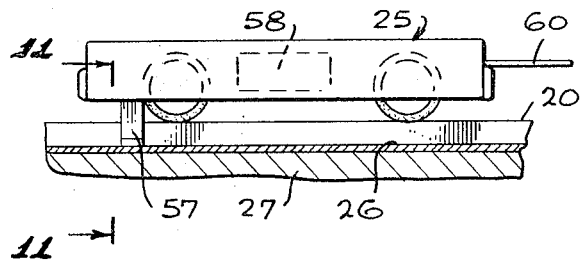
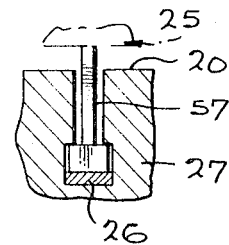
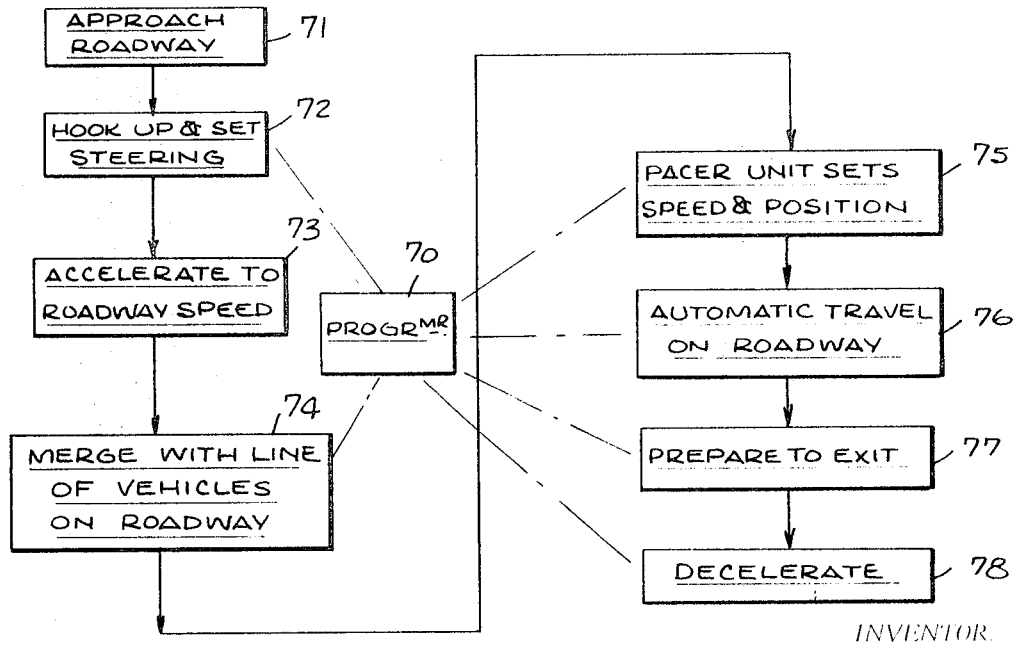

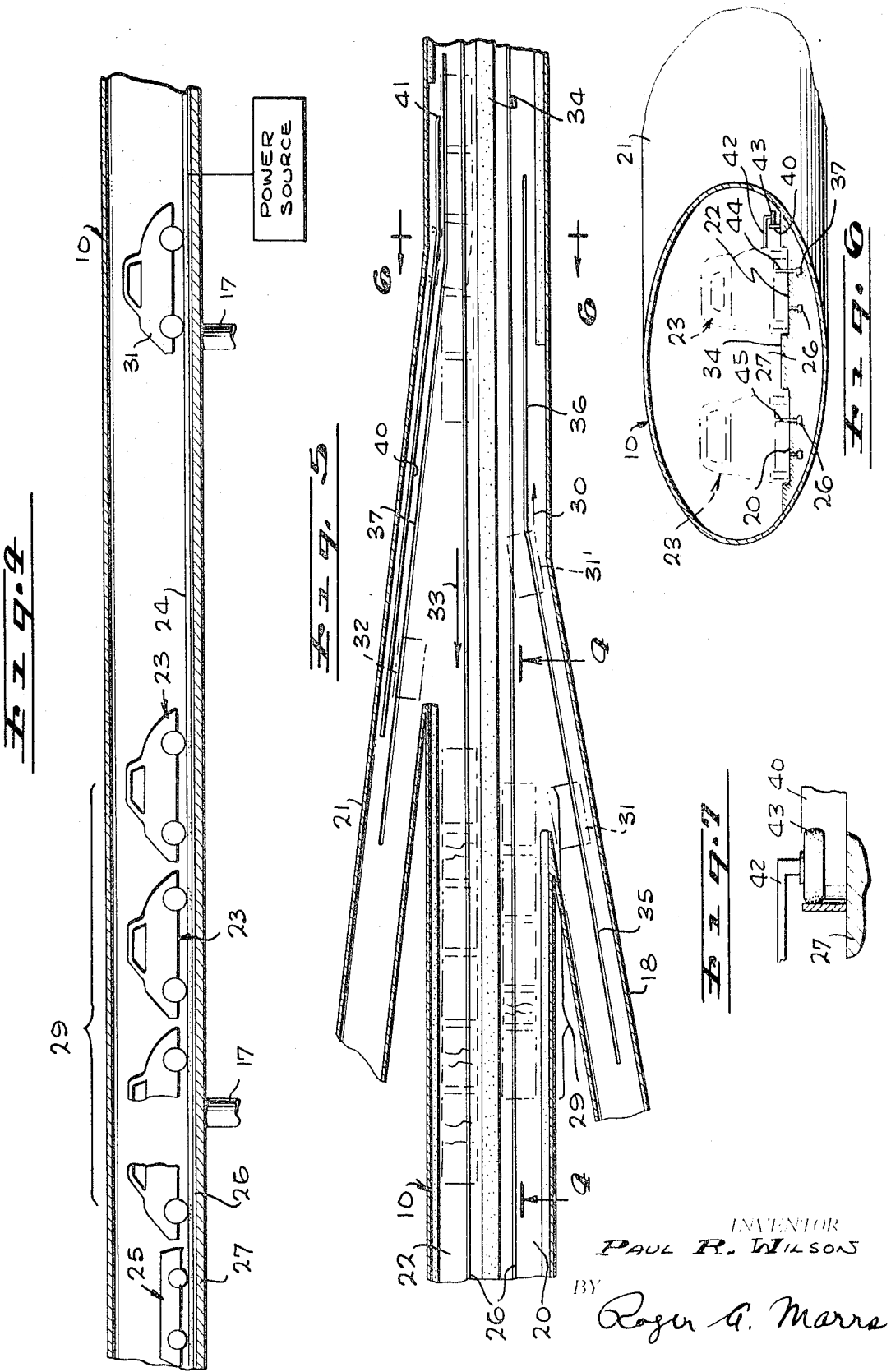

VEHICULAR TRANSPORTATION SYSTEM AND APPARATUS

BACKGROUND OF THE INVENTION

1. Field of the INVENTION

This invention relates to automatic rapid transportation systems and, more particularly, to a novel system and apparatus by which a plurality of individual self-propelled vehicles are selectively combined with controlled groups of vehicles travelling at a common, uniform speed along a main traffic course and which are adapted to be diverted or separated from the controlled group at the selection of the driver for each of the individual vehicles.

2. Description of the Prior Art

Man's improved technology has wrought tremendous advantages in many fields, but relatively little has been done in the field of mass rapid transportation that has practical value. Transportation systems, both public in the form of trains and busses or private in the form of freeways, are presently built by conventional methods and to standards which have been in use for many years. For this reason, a tremendous amount of expense, inconvenience and labor goes into the creation of a so-called mass rapid transportation system which is generally considered to be obsolete before construction is completed for its intended use. Improvement in private transportation concepts which are permitted by modern technological approach and conceptual improvement can readily reduce the cost of such systems and make them more usable by the employment of self-propelled passenger vehicles having the capacity for operating independently as well as having the capability of being combined with a group of vehicles so as to become a unitary grouping for controlled purposes.

One prior attempt to provide an automatic vehicular monorail transportation system is disclosed in U.S. Pat. Nos. 3,101,677; 3,143,020 and 3,118,392 which generally provide for an automatic vehicular monorail system in which self-propelled vehicles automatically move from station to station with little or no manual control required. Conventional passenger vehicles are employed which are modified to include a receiver structure secured to the roof thereof adapted to be detachably engaged with a pickup member movably carried on a conveyor system. Obviously, such a conventional system encounters a variety of problems and difficulties involving first, the securement of the receiver member onto the conventional car and secondly, providing a means for stabilizing the car once it has been picked up by the conveying system. Another difficulty resides in the fact that the system is not readily adapted for high-speed operation in foul weather environments and the mechanism necessary to effect pickup and detachment of the cars on an individual basis is extremely cumbersome. Furthermore, such a system seriously suffers from a controlled point of view since no means are provided for varying the spacing between one or more cars once the car has been combined with the conveyor system.

In addition, transportation systems which employ conventional vehicles having internal combustion engines do not alter the serious air pollution conditions existing in major cities. Major modification is required to convert such conventional vehicles for use in automatic control systems wherein programmed processing of a plurality of vehicles is anticipated not only for system flexibility but for safety purposes.

Therefore, a need has long been present for a truly mass rapid transportation system which is economical, adapted for programmed control and which permits employment of individual vehicles operable in a controlled grouping on a predetermined course or track or separately operable as an independent vehicle on conventional roadways under its own power.

SUMMARY OF THE INVENTION

Accordingly, the novel transportation system apparatus of the present invention obviates the problems and difficulties encountered with prior systems and equipment and which provides a dual-mode, continuous-flow concept in which small electric passenger vehicles are used both on conventional roadways and on a specially designed rapid transit course or line. An accelerator means is installed on an on ramp leading to the main transit line for increasing the velocity of an approaching vehicle to equal or exceed the velocity of oncoming controlled groups of vehicles. Each controlled group of vehicles is under the direction of a pacer vehicle adapted to determine the dimensional space or interval between adjacent controlled vehicle groupings. Both the passenger vehicles and the pacer vehicles are electrically propelled by means of a common bus line carried by the main transit line. Guide means are provided for effecting controlled separation of a particular vehicle from its combined group so that selective exiting of each passenger vehicle may be readily achieved.

A feature of the invention resides in the fact that the passenger vehicle is fully equipped with an electrical power plant, drive train, steering mechanism, braking system and special equipment including means for sensing its proximity with respect to other vehicles, means for releasably engaging the power plant with the common bus line and means adapted to be laterally extended cooperating with the guide means for effecting exciting of the vehicle from the main transit line.

Therefore, it is among the primary objects of the present invention to provide a vehicular transportation system which includes a plurality of individual self-propelled vehicles adapted to travel at a common, uniform speed on a main transit line to selected designated exit means located along the line and once diverted to such an exit means, each vehicle is operated under its own power for continued travel.

Another object of the present invention is to provide a novel mass transportation system involving a plurality of self-propelled vehicles adapted to be introduced to a controlled grouping of vehicles on a main transit line whereby power and steering is automatically controlled.

Another object of the present invention is to provide a novel rapid mass transportation system and apparatus therefor including a plurality of passenger vehicles adapted to be arranged in controllable groups on a continuous two-way line or course, either elevated, surface, or underground, and including a precisely controlled electric pacer vehicle adapted to control spacing intervals between adjacent controlled groups of passenger vehicles.

Still another object of the present invention is to provide a novel rapid mass transportation system and apparatus in which the plurality of self-propelled cars may be controllably grouped together on a continuous course and which includes means for separating selected ones of the passenger vehicles from the controlled group so that the selected passenger vehicle may be exited from the continuous course under its own power for sustained driving on conventional roadways.

Yet another object of the present invention is to provide a novel rapid mass transportation system and apparatus in which each car of a plurality adapted to be accommodated by a continuous course or line is fully equipped as an operational vehicle adapted to travel conventional surface roadways, which incorporates switching apparatus adapted to derive power from a common source to other vehicles when on the continuous course or line and includes selectively operated means for controllably separating a particular vehicle from the course or line so as to operate in a conventional manner.

A further object of the present invention is to provide a novel mass transportation system permitting commuters to travel point-to-point without transfer and without changing vehicles during the course of travel.

Still a further object of the present invention is to provide a novel personal transportation system available at any time during the day for point-to-point transportation, comfortably and with privacy, within densely populated areas wherein the system is adapted for automatic combination of separate self-propelled vehicles as well as means for effecting single vehicle separation therefrom.

Another object of the present invention is to provide a novel transportation system having means to secure fail-safe operation of a plurality of vehicles in a single lane continuous flow line and which incorporates a combination of electronic and mechanical controls.

It is still a further object of the present invention to provide a novel personal transportation system available for point-to-point transportation with comfort and privacy by employing a plurality of self-propelled electric vehicles adapted for individual and independent travel on conventional roadways as well as adapted to be combined with other vehicles of the same type in controlled groupings on a continuous course or line and including accelerating means for controlling an approaching vehicle so that it may be properly combined with controlled groups of vehicles travelling the main traffic line.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 illustrates a general plan view of populated communities connected by the vehicular transportation system and apparatus of the present invention;

FIG. 2 is a side elevational view of a portion of the transportation system employing an elevated main traffic course or tube and further illustrating a typical access means joined therewith;

FIG. 3 is a plan view of the transportation system shown in FIG. 2 illustrating access means located on opposite sides of the main traffic tube for accommodating traffic entering the tube and exciting the tube, respectively;

FIG. 4 is a longitudinal sectional view of a portion of the main traffic tube showing a group of passenger vehicles under the control of a pacer vehicle as taken in the direction of arrows 4-4 of FIG. 6;

FIG. 5 is a transverse sectional view of the typical interchange of the entrance and exit access means with the main traffic tube as employed in the present transportation system;

FIG. 6 is a cross-sectional view of the main traffic tube shown in FIG. 5 as taken in the direction of arrows 6-6 thereof;

FIG. 7 is an enlarged view of an extendable arm carried by a vehicle in engaging position with a guide rail during exiting of the vehicle from the main traffic tube;

FIG. 8 is a side elevational view of a passenger vehicle employed in the transportation system of the present invention;

FIG. 9 is an end view of the vehicle shown in FIG. 8;

FIG. 10 is a side elevational view of the pacer vehicle employed in the transportation system;

FIG. 11 is an enlarged fragmentary view of the power connection extending between the pacer vehicle and the main power bus line as taken in the direction of arrows 11-11 of FIG. 10;

FIG. 12 is a diagrammatic view of a suitable means for accelerating an approaching passenger vehicle preparatory to merging with other vehicles in the main traffic tube;

FIG. 13 is an enlarged sectional view of the accelerating means shown in FIG. 12 as taken in the direction of arrows 13-13 thereof and FIG. 14 is a block diagram showing the sequence of procedures encountered in entering and exiting the main traffic tube by a self-propelled passenger vehicle which may be under the control of a centralized computer program.

DESCRIPTION OF THE PREFERRED EMBODIMENT

Referring to FIG. 1, a diagrammatic illustration is shown in which the transit line of the rapid mass transportation system and apparatus of the present invention indicated by numeral 10 extends between populated areas 11 and 12, respectively. Additional populated areas 13 and 14 are located between the major population centers 11 and 12 and may be representative of smaller populated communities. However, it is to be understood that the transportation system may readily extend across a metropolis in which the communities 11 and 12 may be considered a suburban community and downtown area, respectively, with subcommunities 13 and 14 located therebetween. The transportation system may follow a route which interconnects with the subcommunities 13 and 14 as shown in solid lines or the system may directly interconnect by means of a route indicated in broken lines by numeral 15. In either event, the course or line of the system route is a continuous two-way tube, which may be elevated, subterranean, or constructed on the ground surface. The system course or line is intended to handle a large volume of vehicular traffic for commuter and exurban travel from center to center or point-to-point whether between cities or inner city transportation at speeds considerably greater than present subway averages, in individual private and comfortable vehicular units.

Referring now to FIGS. 2 and 3, the course or line 10 comprises a tube, oval in cross section, which is elevated above ground surface 16 by means of a plurality of pylons 17. The tube is completely enclosed so as to encase the roadbed for handling a plurality of passenger vehicles therein without subjecting the vehicle to adverse environmental climactic conditions. Since the course or line is enclosed, the passenger vehicles encounter no adverse effects due to rain, snow, wind or the like. If desired, the tube may be provided with air-conditioning systems adapted to compensate for hot or cold ambient environmental climate or windows may be suitably placed in the sidewalls thereof.

At predetermined locations along the length of the course or line 10, there is provided access means by which individual passenger vehicles may enter and merge with the main stream of traffic carried in the tube as well as permitting a passenger vehicle to exit therefrom. As shown in FIG. 3, an on ramp tube 18 is provided in which an approaching vehicle is introduced to a right-hand lane 20 within the tube 10. An off ramp 21 is provided for returning exiting vehicles from the line 10 to the conventional adjacent roadways from a lane 22. It is to be understood that mainstream traffic travelling in lanes 20 and 22 are in opposite directions pursuant to the conventional driving custom by which drivers drive in the right-hand lane in their direction of travel.

In FIG. 4, the inside of the oval tube 10 is displayed to illustrate a plurality of individual passenger vehicles, such as is indicated by numeral 23 which comprise the main stream of traffic within the tube. The vehicles 23 travel over a roadbed 24 formed on the bottom internal surface of the tube and are arranged in controlled groups in close proximity to each other and in a series end-to-end relationship. The rearmost vehicle of any one controlled group is a pacer vehicle or drone 25 which is a four-wheeled driverless chassis that is powered by one or more electric motors. Each of the passenger vehicles 23 is self-propelled by means of an electric motor. When the plurality of passenger vehicles 23 are in a controlled group forward of a pacer vehicle 25, both the pacer vehicle and passenger vehicles are connected to a common bus line 26 carried in thickened portion 27 constituting the bottom or lower portion of the oval tube 10. A suitable power source 28 is connected to the common bus line 26 so that sufficient electrical power is provided thereto for driving the pacer and passenger vehicles.

In FIG. 5, it can be seen that the on ramp tube 22 opens into communication with the right-hand lane 20 as the stream of main traffic flows in the direction of arrow 30. The pacer and passenger vehicles associated with a controlled group are illustrated in dotted or broken lines for clarity purposes. Also, a vehicle 31 shown in broken lines illustrates the position of an approaching passenger vehicle in the on ramp tube 18 preparatory to merging with the main stream of traffic. The vehicle 31 is illustrated in its advanced position in broken lines represented by numeral 31' as it merges ahead of a controlled group 29 of vehicles coming from the rear of the entrance of the on ramp tube with the main traffic line 10. The off ramp tube 21 is in communication with the interior of the main traffic course or line 10 and is angularly disposed with the lane 23 in the same manner as the on ramp tube 18 so as to accommodate the exiting of a passenger vehicle from the controlled group such as is represented by numeral 32 in broken lines. The traffic in roadway or lane 22 travels in the direction of arrow 33 which is opposite to the direction of travel of the vehicles in lane 20.

A central barrier or walkway 34 divides the lanes or roadways 20 and 22 and is preferably integrally formed with the thickened portion 27 of the tube 10.

Each roadway or lane 20 and 22 includes the bus line 26 suitable for supplying power to the controlled group of passenger vehicles and the pacer vehicle 25. However, on ramp tube 18 includes an accelerating means including an elongated looped slot 35 formed in the on ramp roadway as it approaches the roadway 20 where it merges in an approach segment slot 36 formed in the thickened portion 27 substantially parallel to the common bus line 26. To this end, the bus line 26 is not in the center of the road way and is in parallel spaced relationship with respect to the approach segment 36. With respect to the off ramp tube 21, a supplemental bus line 37 is provided in addition to a deceleration means to accommodate the exit of a particular vehicle from the controlled group travelling in the direction of arrow 33 on the roadway 22.

Off ramp tube 21 includes a rail 40 that is carried in fixed spaced relationship with respect to the internal wall defining the tube. The rail 40 extends into a portion of tube 10 at the juncture of off ramp tube 21 therewith and includes an angular portion 41 formed at the extreme end thereof serving to define an entrance into the space between the inside surface of the wall defining the tube 10 and the rail 40 so as to receive a wheel outwardly extending from the side of a passenger car 23.

Referring now to FIG. 6, it can be seen that a passenger vehicle 23 in roadway 22 is provided with a laterally extendable arm 42 having a roller 43 rotatably carried on the cantilevered end thereof. When extended, the roller 43 will enter the entrance to the space defined between rail 40 and the inside wall surface of the tube 10 so that the direction of vehicle travel will be under the control of the rail 40. As the vehicle progresses, roller 43 will be moved in the direction of the contour or the rail 40 which extends into the off ramp tube 21. The passenger vehicle 23 will follow inasmuch as it is fixedly connected to the roller 43 so that the vehicle will leave the main stream of traffic in tube 10 and be diverted into the off ramp tube 21. The car associated with roadway 22 is also illustrated as having a link or key 44 which downwardly extends from the vehicle in communication with the supplementary power line 37 so as to provide sufficient power on the off ramp until the vehicle is clear of the main line. At that time, the key 44 retracts and decelerators are employed to slow the car until the driver can take over control. FIG. 6 also shows the vehicle associated with roadway 20 having an extension power link 45 which is in engagement with the common bus line 26 so as to provide power to the vehicle when it is combined in a controlled group of vehicles.

In FIG. 7, the extendable arm 42 is shown cantilevered laterally from the side of a vehicle so that the peripheral edge of wheel 43 encounters the inside surface of rail 40. The wheel will follow the general contour of the rail 40 and will direct the direction of vehicle travel accordingly as previously described.

Referring now to FIGS. 8 and 9, the passenger vehicle 23 is illustrated which is suitable for accommodating a driver and at least one passenger. However, it is to be understood that the size and accommodations of the vehicle may vary and do not form a part of the present invention. Each vehicle 23 includes a steering mechanism 50 intended to be employed by the vehicle driver to control the direction of travel when the vehicle is employed on conventional roadways under its own power. The vehicle also includes a suitable brake system operably connected to the wheels 51 or 52 thereof. Conveniently located on the chassis of the vehicle, there is provided an electric motor or motors 53 and sufficient battery power packs for operating the vehicle on surface roadways for prolonged lengths of time without recharging. Each vehicle includes a forward or rearward probe 54 adapted to be selectively extended when the vehicle has merged with the main stream of traffic within the tube 10. The probe 54 is employed to sense the presence of a car immediately ahead or behind the vehicle on which the probes are carried so that the vehicles may be closely compacted in a controlled group immediately ahead of a pacer vehicle 25. Each vehicle includes the downwardly extendable power link 45 which selectively communicates electrically with the common bus line 26. Suitable controls are provided on an instrument panel 55 for operating both the probe 54 and the extendable key or link 45. Also located on the instrument panel 55 are suitable switches for energizing an actuator 56 adapted to move the laterally extendable wheels outward from the sides of the vehicle. Located at the rear of the vehicle, there is provided a suitable means for mounting the key link 44 when it is desired to accelerate the passenger vehicle as it approaches a controlled group of vehicles into which is is to be merged.

In FIG. 10, the pacer vehicle 25 is illustrated which represents a four-wheel driverless chassis that is suitably powered by one or more electric motors. The pacer has three essential purposes which are: (1) to provide even, controlled spacing on the traffic line, (2) to act as a nucleus on which groups of a predetermined number of cars, such as 10 for example, may form, and (3) to provide emergency power or control if needed. Although all passenger cars are powered and controlled by the bus line electrical supply, the pacer vehicles are provided with more elaborate and precisely controlled systems which permit continuous monitoring of all pacers by a line control station (not shown). Each pacer vehicle is provided with a power link 57 extending through the thickened portion 27 into communication with the bus line 26 as shown more clearly in FIG. 11. Suitable electrical connections couple the power link 57 with an electric motor 58. As in the instance with passenger vehicles, the pacer vehicle includes a forwardly extending probe 60 adapted to sense the presence of a passenger vehicle immediately ahead thereof. Each pacer 25 is further equipped with suitable controls to permit the pacer to reverse its direction of travel and to engage the controlled group of vehicles immediately behind. This ability is important in emergency situations wherein the pacer may be employed for braking purposes.

Referring now to FIGS. 12 and 13, an acceleration means is provided for increasing the velocity of a passenger vehicle as it approaches the line of traffic in tube 10 so as to be accelerated to a velocity slightly in excess of the oncoming controlled group speed. In one embodiment of an accelerator means, a plurality of pusher plates 64 are fixedly secured to a movable cable 61. The cable carries a piston 62 thereon which may be actuated by any suitable means such as steam or other pressurized source so that the cable moves in the general direction of arrows 63 at relatively high speed. Therefore, when the accelerator key or link 44 has been downwardly extended from the rear of a passenger vehicle 23, the pusher plate 64 will engage therewith as shown in FIG. 13 and forcibly urge the vehicle 23 at an accelerated forward velocity. Once the approaching vehicle has achieved a predetermined speed, the accelerator link 44 may be retracted so as to cause disengagement with the pusher plate 64 and the vehicle power link 45 may be extended into contact with the bus line 26. It is to be noted with respect to FIG. 13 that pusher plate 64 and 64' move in opposite directions as the cable 61 moves in an endless and continuous loop. Each of the pusher plates 64 travel in a looped channel wherein the linear segments of the loop are in elongated parallel relationship with respect to each other.

To achieve relatively operable engagement between the accelerator link extension 44 and an associated pusher plate 64, the link is preferably provided with a resilient damper on its mounting in the car so that any abnormal initial shock encountered by engagement of a pusher plate with the accelerator link 44 will be absorbed. Thereafter, the load transference through the link will be distributed to the vehicle and the vehicle will in turn accelerate to the velocity of the pusher plate.

Referring now to FIG. 14, a computer programmed system is illustrated under the control of a programming apparatus 70. The apparatus 70 is in communication with various on ramps and off ramps of the transit system as well as the main transit line so that approaching vehicles, controlled groups in transit, and particular vehicles separated from the control groups for diversion to off ramps, can be monitored and controlled. Initially, a vehicle travels on an approach roadway 71 and proceeds to a hookup and set-steering location 72. The accelerating means is actuated by means 73 when the approach vehicle is accelerated to main traffic roadway speed. The approaching vehicle is merged 74 with a controlled group of vehicles on the main traffic line 10 and the pacer unit 75 sets the speed and position of the controlled group of vehicles. The controlled groups are automatically propelled on the roadway 76 normally employing the electric motor in each vehicle until such time as the driver elects to separate from the controlled group. In this latter instance, the driver will actuate the necessary extended rollers in preparation 77 to exit which also includes the step of releasing the locked manual steering. As the diverted vehicle separates from a controlled group, the vehicle is decelerated 78 and is under the operational control of the driver, including the vehicle's electric motor.

Not only the on and off ramps and main transit line be sensed and monitored by the programmer 70, but the various controls and actuating means carried on the passenger vehicles may be programmed and operated thereby so that many of the driver decisions may be handled automatically and in concert with all of the vehicles connected on the system. Therefore, by means of the programming apparatus 70, the system may be completely on line with precision and safety assured to all drivers and occupants of the vehicles.

In operation, a commuter may drive from his home for a mile or two to the nearest main transit line on ramp 18 and into an approach accelerator means 35. At this point, the accelerator link 44 is dropped into the channel so as to be engaged by a pusher plate 64. At this point, the programming apparatus 70 takes over and prepares the car or vehicle for operation on the main traffic line and the commuter can now relax and need not concern himself with actual merger or transit on the main traffic line.

Travelling the tube line 10 in each direction are powerful, precisely controlled electric pacers or line drones. These pacers are spaced evenly approximately every 400 feet or further, depending upon traffic loads. Each pacer acts as a nucleus on which up to 10 cars may form as a controlled group and assures an emergency backup control.

The approaching car is accelerated by the accelerator means smoothly but very rapidly up to approximately 90 miles per hour or any other predetermined line speed, and is merged a substantial distance ahead of the first car in an approaching control group. The merging car speed drops off slightly and it appears to drift back to the controlled group where it becomes the lead car. In other words, the speed of the merging car decreases so that the controlled group therebehind catches up with it.

The controlled group maintains its speed and cohesion by the speed control probes 54 on each vehicle which contact the vehicle ahead and behind. The probes govern the power to each vehicle in order to maintain each vehicle at an exact, common speed. If additional power is needed, bumper-to-bumper contact may be made with the pacer providing increased power to maintain line speed of the group. The pacer 25 behind each control group establishes precise and uniform speed, with added power if necessary. The controlled group passes a variety of off ramps at constant speed. Additional cars merge with the controlled group until it has preferably 10 cars, then no more. As any car arrives at its selected exit ramp, it slides out from the group, permitting the portion of the group ahead to drift back into cohesive contact with the remaining portion behind so as to allow another car to be added in front.

As a particular vehicle slides out from the group to be separated therefrom, the driver manually or under control of the programming apparatus, causes extendable arm 42 to laterally extend so that the roller 43 comes into contact with the rail 40 so that the vehicle forcibly is pulled in the direction of the contour of the rail 40. Automatic decelerators slow the exiting car, finally allowing it to roll out on a debarkation lot with control of the car returned to normal driver operation. The driver may now travel under battery power on surface streets to his ultimate destination.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A vehicular transportation system for processing a plurality of individual vehicles comprising:
   a main transit line having at least one lane of traffic accommodating a group of said individual vehicles in a predetermined direction;
   means for propelling said vehicles in said group along said lane;
   means travelling in said lane of said line in communication with said group for controlling the speed of said group along said lane from one point to another; and
   said last mentioned means including a drone vehicle carried on said lane and controllably interconnected with said propelling means of groups of vehicles so as to accommodate inclusion in said group of additional vehicles merging into said lane ahead of said group.

2. The invention as defined in claim 1 including releasable coupling means cooperatively carried on said vehicles for including and excluding said additional vehicles to and from said group during travel along said line.

3. The invention as defined in claim 2 including means carried in each of said vehicles for propelling each vehicle independently and in combination in said group.

4. The invention as defined in claim 1 including:
   diverting means carried by each of said vehicles and said line in cooperating relationship at selected locations along said lane for effecting separation of a selected vehicle from the plurality.

5. The invention as defined in claim 4 wherein:
   said line comprises an enclosed tube, oval in cross section, having a pair of parallel roadways constituting two lanes for supporting vehicular traffic travelling in opposite directions and further including an on ramp tube in communication with one of said lanes and carrying a portion of said acceleration means and an off ramp tube in communication with said other lane and carrying a portion of said diverting means.

6. The invention as defined in claim 1 wherein:
   said plurality of vehicles form a controlled group of vehicles under command of said drone vehicle.

7. The invention as defined in claim 6 wherein:
   each of said vehicles in said controlled group and said drone vehicle include electromotive power plants; and
   a common source of electrical power for energizing said electromotive power plats so that all vehicles in said controlled group are simultaneously energized.

8. The invention as defined in claim 7 wherein:
   each of said vehicles includes a downwardly extendable power link adapted to selectively engage with said common source of electrical power.

9. The invention as defined in claim 8 wherein:

said drone vehicles and each of said vehicles in said controlled group include sensing probes adapted to engageably contact one of said vehicles in said controlled group.

10. The invention as defined in claim 9 wherein:

said line comprises an oval tube having at least two parallel roadways constituting lanes for carrying vehicular traffic in opposite directions; and each of said roadways having a plurality of on ramp tubes and a plurality of off ramp tubes angularly connected to said oval tube in fixed spaced-apart relationship for permitting approaching vehicles to merge with a selected controlled group and to be separated from said selected controlled group.

11. The invention as defined in claim 10 including:

acceleration means detachably coupled to an approaching vehicle for increasing the velocity thereof to exceed the velocity of said controlled group.

12. The invention as defined in claim 11 including:

programming means operably connected to said drone vehicle and each vehicle in said controlled group for controlling speed, monitoring performance and controlling merging and separation of selected vehicles with and from said controlled group.